United States Patent
Aronowitz (10) Patent No.: US 7,725,319 B2
(45) Date of Patent: May 25, 2010

(54) PHONEME LATTICE CONSTRUCTION AND ITS APPLICATION TO SPEECH RECOGNITION AND KEYWORD SPOTTING

(75) Inventor: Hagai Aronowitz, Petah-Tikva (IL)

(73) Assignee: Dialogic Corporation, Santa Clara, CA (US)

( * ) Notice: Subject to any disclaimer, the term of this patent is extended or adjusted under 35 U.S.C. 154(b) by 1166 days.

(21) Appl. No.: 10/616,310

(22) Filed: Jul. 7, 2003

(65) Prior Publication Data
US 2005/0010412 A1 Jan. 13, 2005

(51) Int. Cl.
G10L 15/10 (2006.01)
(52) U.S. Cl. .................................... 704/253
(58) Field of Classification Search ............... 704/253
See application file for complete search history.

(56) References Cited

U.S. PATENT DOCUMENTS

| | | | | |
|---|---|---|---|---|
| 5,805,772 | A * | 9/1998 | Chou et al. | 704/255 |
| 5,995,928 | A * | 11/1999 | Nguyen et al. | 704/251 |
| 6,224,636 | B1 * | 5/2001 | Wegmann et al. | 704/246 |
| 6,304,844 | B1 * | 10/2001 | Pan et al. | 704/257 |
| 6,985,861 | B2 * | 1/2006 | Van Thong et al. | 704/254 |
| 7,031,923 | B1 * | 4/2006 | Chaudhari et al. | 704/273 |
| 7,310,600 | B1 * | 12/2007 | Garner et al. | 704/234 |
| 2003/0204399 | A1 * | 10/2003 | Wolf et al. | 704/251 |
| 2004/0267529 | A1 * | 12/2004 | Baker | 704/252 |
| 2007/0033038 | A1 * | 2/2007 | Strong | 704/251 |

OTHER PUBLICATIONS

Srinivasan et al., Phonetic Confusion Matrix Based Spoken Document Retrieval, 2000, ACM, pp. 81-87.*
Amir et al., Advances in Phonetic Word Spotting, 2001, ACM, pp. 580-582.*
D.A. James & S.J. Young, "A Fast Lattice-Based Approach to Vocabulary Independent Wordspotting," IEEE, 1994, pp. 1-377-1-380, Cambridge University Engineering Department, Cambridge, UK.

\* cited by examiner

*Primary Examiner*—Susan McFadden
(74) *Attorney, Agent, or Firm*—Trop, Pruner & Hu, P.C.

(57) ABSTRACT

An arrangement is provided for using a phoneme lattice for speech recognition and/or keyword spotting. The phoneme lattice may be constructed for an input speech signal and searched to produce a textual representation for the input speech signal and/or to determine if the input speech signal contains targeted keywords. An expectation maximization (EM) trained phoneme confusion matrix may be used when searching the phoneme lattice. The phoneme lattice may be constructed in a client and sent to a server, which may search the phoneme lattice to produce a result.

13 Claims, 9 Drawing Sheets

PHONEME LATTICE CONSTRUCTION AND ITS APPLICATION TO SPEECH RECOGNITION AND KEYWORD SPOTTING

BACKGROUND

1. Field

The present invention relates generally to speech processing and, more specifically, to phoneme lattice construction and its application to speech recognition and keyword spotting.

2. Description

Automatic speech recognition (ASR) or automatic keyword spotting (AKS) is a process of transforming an audio input into a textual representation. This process may comprise two phases: transforming the audio input into a sequence of phonemes, and transforming the sequence of phonemes into a sequence of words or detecting keywords in the sequence of phonemes. These two phases, however, are mathematically coupled and usually must be performed jointly in a single process. A typical ASR system uses hidden Markov models (HMMs) and dynamic programming search to perform the two phases jointly. Similar techniques are used for a typical AKS system.

Recently, the concept of distributed speech recognition (DSR) was introduced and the speech processing research community has invested considerable efforts in this approach. The main idea in DSR is to distribute the computation of a speech recognition application between a client and a server. The current standard defined by the European Telecommunications Standards Institute (ETSI) is very limited because only a small fraction of computation is performed by a client. Such a limitation is largely due to the fact that it is hard to separate the two phases of the computing process in a typical ASR or AKS system. The portion of computation performed by a client, as specified by the ETSI, is parameterization of a speech signal, specifically, extracting Mel-frequency cepstral coefficients (MFCC) for each short segment of the speech signal. Nowadays even a small handheld device (e.g., Intel Xscale Architecture based personal digital assistants (PDAs)) can have much more computing power than that required by parameterization of a speech signal. Thus, it is desirable for a DSR system to distribute more jobs to a client device without sacrificing recognition accuracy.

For an AKS application, on one hand, audio data to be searched may be large and might not be able to be stored in a client device. On the other hand, a user may want to submit a search request from a mobile device. Therefore, it also is desirable to distribute AKS processing between a client and a server.

BRIEF DESCRIPTION OF THE DRAWINGS

The features and advantages of the present invention will become apparent from the following detailed description of the present invention in which.

DETAILED DESCRIPTION

An embodiment of the present invention is a method and system for phoneme lattice construction for speech processing such as speech recognition and keyword spotting. The present invention may be used for dividing a speech recognition/keyword spotting process into two separate phases. The first phrase may be phoneme lattice construction that is vocabulary and task independent. The second phase may be phoneme lattice search that is vocabulary and task dependent. These two phases may be distributed to a client and a server. The client may construct a phoneme lattice for an input speech signal and transfer parameters of the phoneme lattice to the server. The server may search the phoneme lattice to produce a textual representation of the input speech signal if the task is to recognize speech, and/or to determine whether the input speech signal contains targeted keywords if the task is to spot keywords. The present invention may also be used to improve the performance of a phoneme lattice for ASR/AKS while maintaining a small size for the phoneme lattice by using new lattice construction and search techniques. These techniques may comprise utilization of backward probabilities and/or acoustic look-ahead and optimization over a number of frames (instead of a single frame) when determining a phoneme path leading to a frame during construction of the phoneme lattice. When searching the phoneme lattice, an expectation maximization (EM) trained confusion matrix may be used; endpoints of an arc in the phoneme lattice may be allowed to be stretched; and repetition of phonemes may be allowed.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
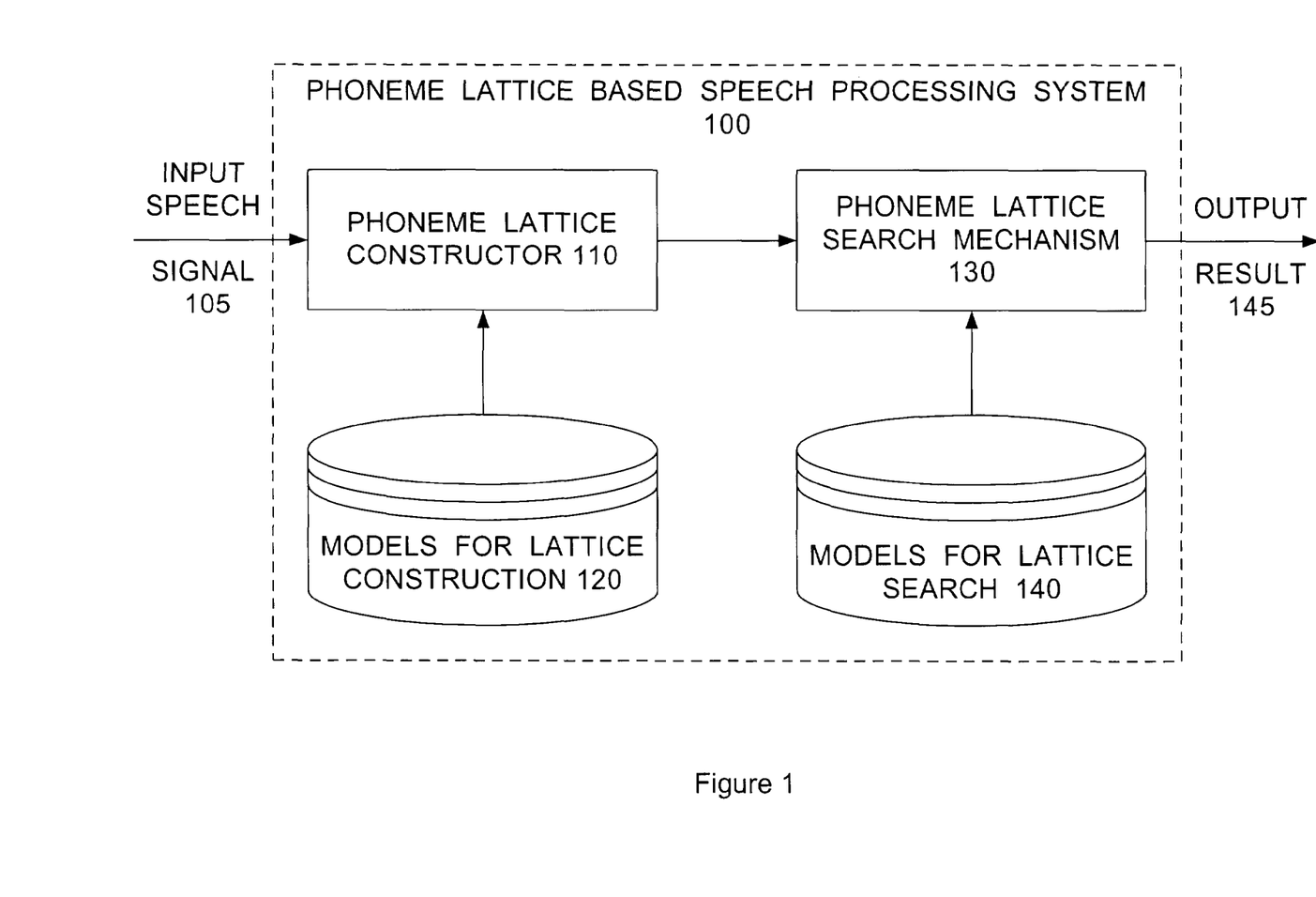
FIG. 1 depicts a high-level framework of an example phoneme lattice based speech processing system, according to an embodiment of the present invention.
Figure 5:
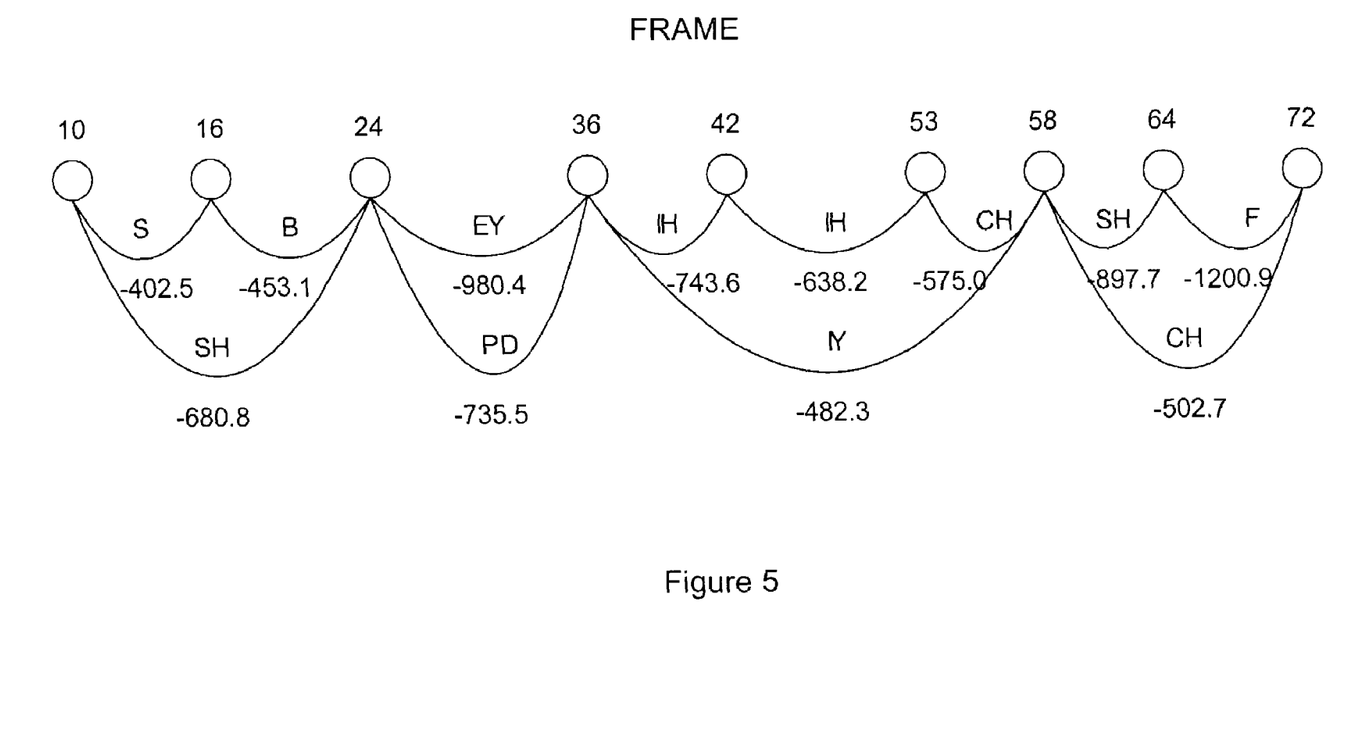
FIG. 5 is an exemplary illustration of a section of a phoneme lattice, according to an embodiment of the present invention.

FIG. 1 depicts a high-level framework of an example phoneme lattice based speech processing system, according to an embodiment of the present invention. A phoneme lattice based speech processing system 100 may comprise a phoneme lattice constructor 110, a plurality of models for lattice construction 120, a phoneme lattice search mechanism 130, and a plurality of models for lattice search 140. The system may transform an input speech signal into text (speech recognition) or spot keywords from an input speech signal (keyword spotting). The phoneme lattice constructor may receive an input speech signal and construct a phoneme lattice for the signal based on the plurality of models for lattice construction. The input speech signal may be segmented into short frames with each frame representing a time point during the speech signal. A phoneme lattice is a directed acyclic graph (DAG). Each node of the graph may be associated with a frame (time point) of the input speech signal. Each edge of the graph may be labeled with a phoneme hypothesis and a score representing the likelihood of that hypothesis. FIG. 5 illustrates a section of a phoneme lattice around an occurrence of the word "speech". The phoneme lattice search mechanism may search the phoneme lattice constructed by the phoneme lattice constructor to produce at least one candidate textual representation of the input speech signal (speech recognition) or to determine how likely the input speech signal contains targeted keywords (keyword spotting), based on the plurality of models for lattice search.

Figure 2:
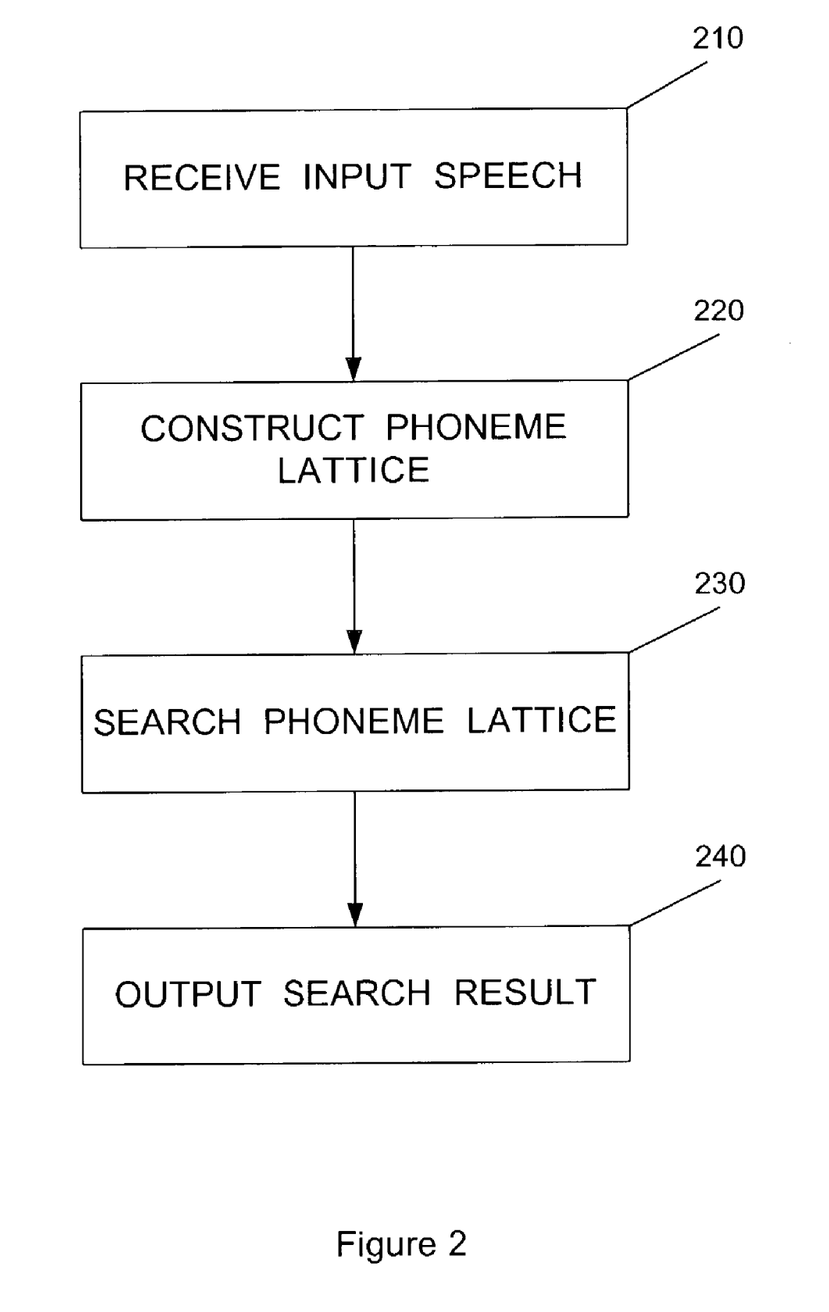
FIG. 2 is an exemplary flow diagram of a process in which a phoneme lattice is constructed and searched to recognize speech or to spot keywords in the input speech signal, according to an embodiment of the present invention.

FIG. 2 is an exemplary flow diagram of a process in which a phoneme lattice is constructed and searched to recognize speech or to spot keywords in an input speech signal, according to an embodiment of the present invention. At block 210, an input speech signal may be received. At block 220, the input speech signal may be processed and a phoneme lattice may be constructed for the signal. The input speech may be segmented into short frames. The short frames may overlap with each other. Acoustic features (e.g., MFCC) may be extracted for each frame. Features across frames may also be extracted to represent the changing characteristics of the input speech signal over a time period. A plurality of models may be used for phoneme lattice construction. The phoneme lattice may provide multiple phoneme sequence representations for the input speech signal. At block 230, the phoneme lattice may be searched to produce at least one candidate textual representation of the input speech signal (speech recognition) or to determine how likely the input speech signal contains targeted keywords. A plurality of models may be used to help search among the multiple phoneme sequences in the phoneme lattice. At block 240, the search result may be outputted. If the task is speech recognition, the output result may be a single best textual representation or a plurality of top best textual representations of the input speech signal. For the latter case, a user may select one result among the plurality of top best results. On the other hand, if the task is keyword spotting, the output result may be whether the input speech signal contains targeted keywords, or a score of likelihood that input speech signal may contain targeted keywords.

Figure 3A:
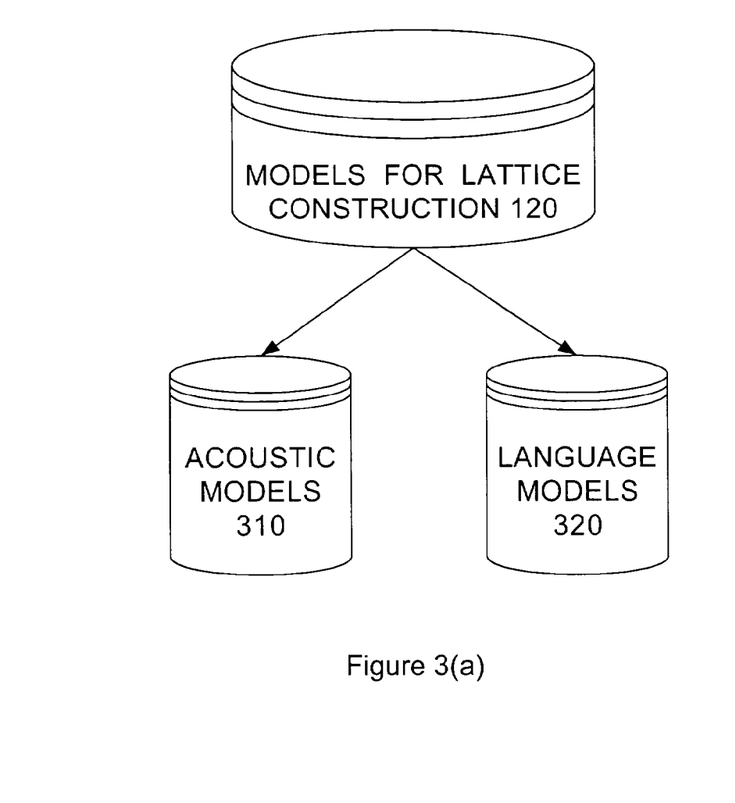
FIG. 3(a) is an exemplary illustration of main components of models for lattice construction, according to an embodiment of the present invention.

FIG. 3(a) is an exemplary illustration of main components of models for lattice construction, according to an embodiment of the present invention. The models for lattice construction 120 may comprise acoustic models 310 and language models 320. The acoustic models may be a number of parameters representing acoustic characteristics of phonemes. These parameters may be trained from a set of acoustic features extracted from audio signals representing phonemes. In one embodiment, the acoustic models may be represented by hidden Markov Models (HMMs). The HMMs may comprise a number of states. A state of an HMM may have a probability associated with it. The state may also associate with an acoustic feature through a probability. Transitions from one state to another or to the state itself may be associated with probabilities. An aggregate of all these probabilities may be used to represent an HMM. The language models may comprise phoneme-level and word-level language models. The phoneme-level language models may be represented by probabilities of one phoneme followed by a number of other phonemes (e.g., probability of Phoneme 1 (Ph1) followed by Phoneme 2 (Ph2), Phoneme 3 (Ph3), ..., Phoneme N (PhN), i.e., Prob(Ph2, Ph3, ..., PhN|Ph1)). Phoneme-level language models that represent probabilities of occurrences of individual phonemes may be called phoneme unigrams (e.g., Prob(Ph1), Prob(Ph2), ... ). If N=2, phoneme-level language models may be called phoneme bigrams (e.g., Prob(Ph2 | Ph1), Prob(Ph5|Ph4), ... ). Similarly, if N=3, phoneme-level language models may be called phoneme trigrams (e.g., (Ph2, Ph3|Ph1), Prob(Ph3, Ph4|Ph1), ... ). Phoneme-level language models may be obtained through training from a set of naturally occurred phoneme sequences (e.g., a word is a naturally occurred phoneme sequence). Similarly, the word-level language models may comprise probabilities of one word followed by a number of other words. The word-level language models may also comprise word unigrams, word bigrams, and/or word trigrams.

Figure 3B:
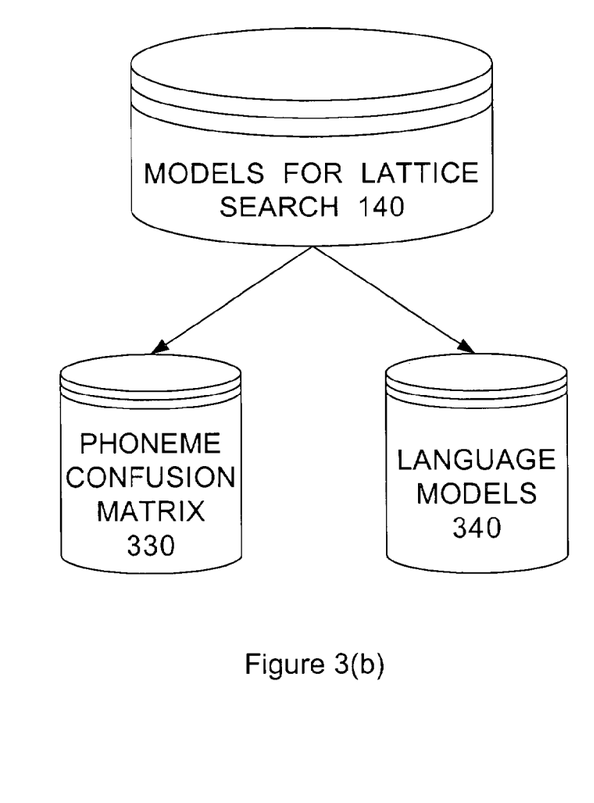
FIG. 3(b) is an exemplary illustration of main components of models for lattice search, according to an embodiment of the present invention.

FIG. 3(b) is an exemplary illustration of main components of models for lattice search, according to an embodiment of the present invention. The models for lattice search 140 may comprise a phoneme confusion matrix 330 and a plurality of language models 340. The phoneme confusion matrix may comprise elements representing probabilities of one phoneme being confused with another by the phoneme lattice search mechanism. The phoneme confusion matrix may be trained from a database that comprises both correct phoneme sequences and their corresponding phoneme sequences outputted from the phoneme lattice search mechanism. The plurality of language models may comprise similar phoneme and word sequence probabilities as described in the above.

Figure 4:
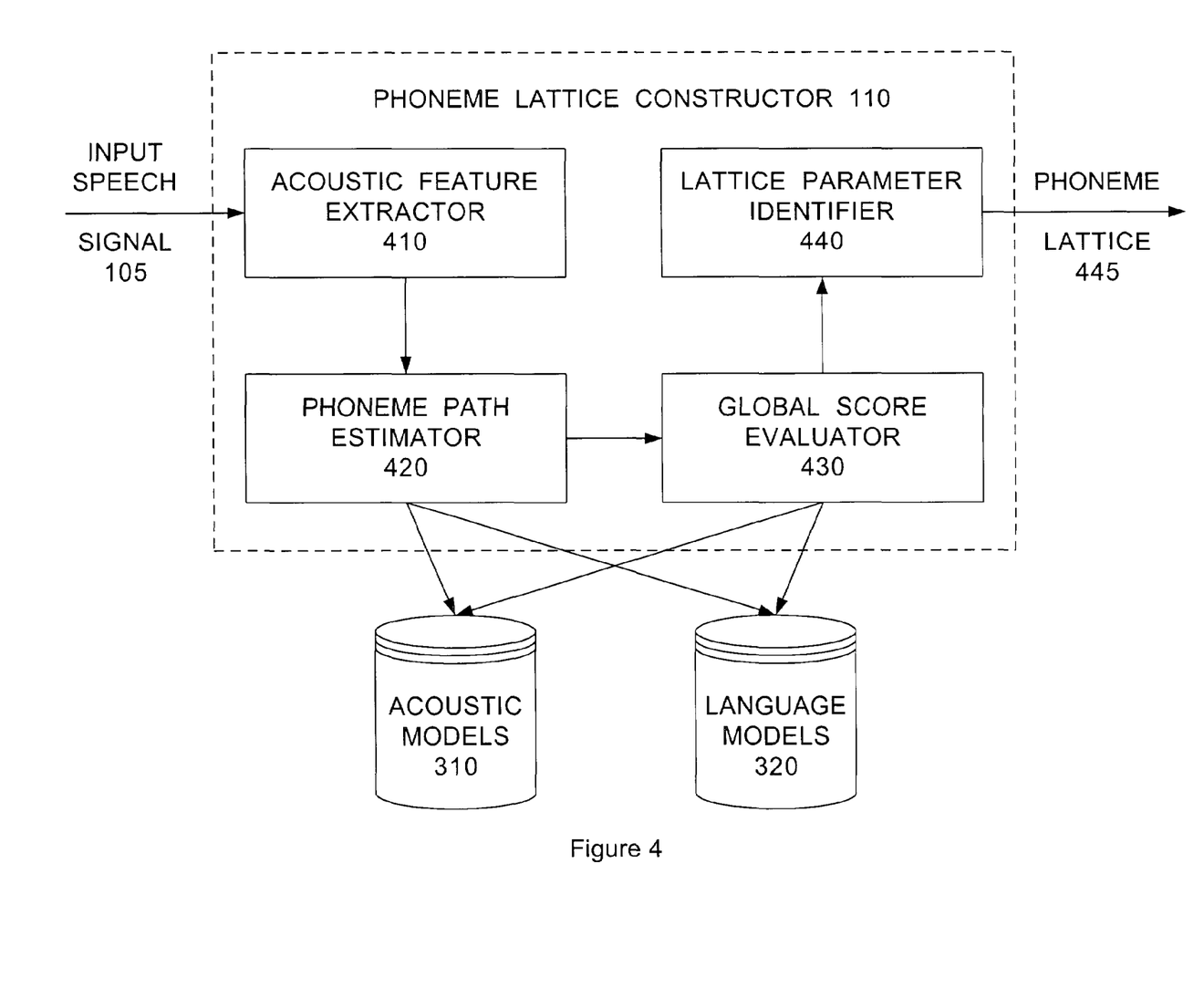
FIG. 4 is a high-level functional block diagram of a phoneme lattice constructor, according to an embodiment of the present invention.

FIG. 4 is a high-level functional block diagram of a phoneme lattice constructor, according to an embodiment of the present invention. The phoneme lattice constructor 110 may comprise an acoustic feature extractor 410, a phoneme path estimator 420, a global score evaluator 430, and a lattice parameter identifier 440. The acoustic feature extractor may first pre-process an input speech signal 105. The pre-processing process may comprise segmenting the input speech signal into short frames. Subsequently, the acoustic feature extractor may extract acoustic features for a frame. The acoustic features may represent acoustic characteristics of the frame. After feature extraction, the input speech may be represented by a sequence of acoustic features.

The phoneme path estimator 420 may estimate a plurality of phoneme paths ending at a frame. The phoneme path estimator may comprise a likelihood score evaluator to calculate a likelihood score for each phoneme path ending at the frame. In one embodiment, HMMs may be used as acoustic models for phonemes and a forward score may be computed for each phoneme hypothesis ending at the frame. The forward score is typically associated with HMMs to estimate likelihood of a phoneme hypothesis in a time-increasing manner (e.g., from frame k, to frame k+1, to frame k+2, ... ). Mathematical details of the forward score can be found in Lawrence Rabiner and Biing-Hwang Juang's "Fundamentals of Speech Recognition," published by Prentice Hall in 1993. There may be many phoneme hypotheses ending at the frame, which may differ in starting frames and/or phoneme identities. Combinations of phoneme hypotheses ending at the frame and preceding phoneme hypotheses may constitute phoneme path hypotheses ending at the frame. A forward score of a phoneme path hypothesis may be a product of forward scores for all phoneme hypotheses along the path, or may be computed directly. Forward scores of all phoneme path hypotheses may be sorted and the top K phoneme path hypotheses may be stored.

The global score evaluator 430 may evaluate the K phoneme path hypotheses found by the phoneme path estimator 420 globally. The global score evaluator may comprise a score computing component to compute a global score for each of the K phoneme path hypotheses. In one embodiment, both a forward score and a backward score may be used to calculate a global score for a phoneme path hypothesis ending at a frame, if HMMs are used. Similar to a forward score, a backward score is also associated with HMMs to estimate likelihood of a phoneme path hypothesis in a time-decreasing manner (e.g., from frame k, to frame k−1, to frame k−2, ... ). Mathematical details of calculating a backward score can be found in Lawrence Rabiner and Biing-Hwang Juang's "Fundamentals of Speech Recognition," published by Prentice Hall in 1993. In another embodiment, acoustic look-ahead technique may be used to replace or combine with the backward score to calculate the global score for a phoneme path hypothesis. Using the acoustic look-ahead technique may be faster than using the backward score for calculating the global score. The acoustic look-ahead technique may incorporate word-level language model probabilities (e.g., word bigrams) as early as possible. For example, the word-level language model probabilities may be incorporated at the end of the first phoneme of a word. On contrast, a conventional method is to incorporate the word-level language model probabilities at the end of the last phoneme of the word. Both the phoneme path estimator and the global score evaluator may use acoustic models as well as phoneme-level and word-level language models in finding phoneme paths and calculating global scores.

The lattice parameter identifier 440 may determine vertices and arc parameters of a phoneme lattice. It may be possible that some frames may be included in many arcs, while others may not. Measures may be taken to average arc-load of different frames. An arc-load of a frame may represent the frequency that the frame is included in an arc of a phoneme lattice. In one embodiment, after calculating global scores for K phoneme path hypotheses for each frame, a chunk of consecutive J-frames may be clustered together so that global scores of K phoneme path hypotheses for all J frames may be evaluated together. All these global scores may be sorted and phoneme paths corresponding to top M global scores may be saved. Accordingly, scores of individual phonemes corresponding to a global score of a phoneme path in which these individual phonemes locate may be obtained in the same way that the global score was obtained. The scores of individual phonemes may be retrieved if these scores are not discarded after global path scores are calculated. Frames where a phoneme starts or ends in each of the M selected phoneme paths may become vertices of the phoneme lattice. Identities and scores of individual phonemes in each of the top M selected phoneme paths may become parameters of corresponding arcs of the phoneme lattice.

The output from the lattice parameter identifier 440 is a phoneme lattice. FIG. 5 is an exemplary illustration of a section of a phoneme lattice, according to an embodiment of the present invention. In this example, the section is from the phoneme lattice around an occurrence of the word "speech." As shown in FIG. 5, vertices of the phoneme lattice are frames (represented by frame indices in the figure). There may be several phoneme path hypotheses leading to a frame. For example, from frame 10 to frame 36, there are 4 phoneme path hypotheses, i.e., S-B-EY, S-B-PD, SH-EY, and SH-PD.

There are two arcs between frame 24 and frame 36 and they are identified as (EY, −980.4) and (PD, −735.5), respectively.

Figure 6:
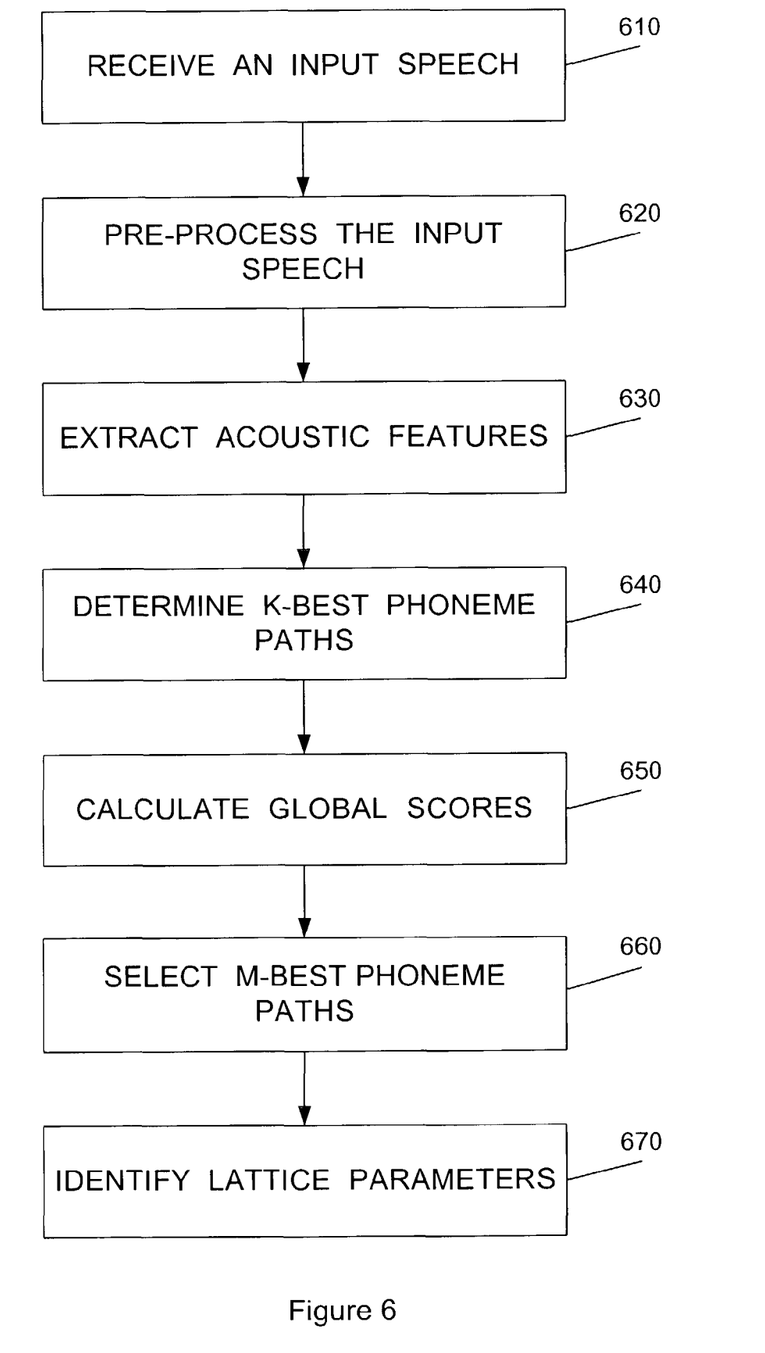
FIG. 6 is an exemplary flow diagram of a process in which a phoneme lattice is constructed for an input speech signal, according to an embodiment of the present invention.

FIG. 6 is an exemplary flow diagram of a process in which a phoneme lattice is constructed for an input speech signal, according to an embodiment of the present invention. At block 610, an input speech signal may be received. At block 620, the input speech signal may be pre-processed. The pre-processing process may comprise segmenting the input speech signal into short frames, adding digital signal processing (DSP) windows (e.g., Hamming, Cosine, and Kaiser Windows) to each frame, and/or mitigating noise. At block 630, acoustic features may be extracted for a frame to represent acoustic characteristics of the frame. The acoustic features may comprise a single type of feature (e.g., linear prediction coding (LPC) coefficients) or a combination of several types of features. At block 640, K-best phoneme paths for each frame may be determined according to a likelihood score associated with each potential phoneme paths leading to a frame. Likelihood scores for all potential phoneme paths leading to the frame may be sorted and phoneme paths corresponding to top K likelihood scores may be selected as the K-best phoneme paths for the frame. Acoustic models and language models may be used to compute the likelihood scores. When HMMs are used for acoustic models, a forward score for a path may be computed as the likelihood score for the path.

At block 650, global scores may be computed for K-best phoneme paths leading to a frame, using acoustic models and language models. If HMMs are used for acoustic models, a score that utilizes both a forward score and a backward score may be used as a global score for a path. Additionally, an acoustic look-ahead technique may be employed to speed up global score computation. At block 660, J sets of global scores of K-best phoneme paths for a chunk of J consecutive frames may be clustered together and sorted. Top M global scores may be selected among a total of J*K scores. The process at block 660 may help reduce the size of a phoneme lattice via a relatively global optimization over more than one frame, compared to a local optimization over a single frame. At block 670, lattice parameters may be identified. The lattice parameters may comprise vertices and arc parameters, which may include phoneme identities and their corresponding likelihood scores. Vertices of a phoneme lattice may be identified as those frames where a phoneme starts or ends in any of M phoneme paths corresponding to the top M global scores for each chunk of J consecutive frames. Arc parameters of the phoneme lattice may be identified as phoneme identities and their individual likelihood scores in any of the M phoneme paths.

Figure 7:
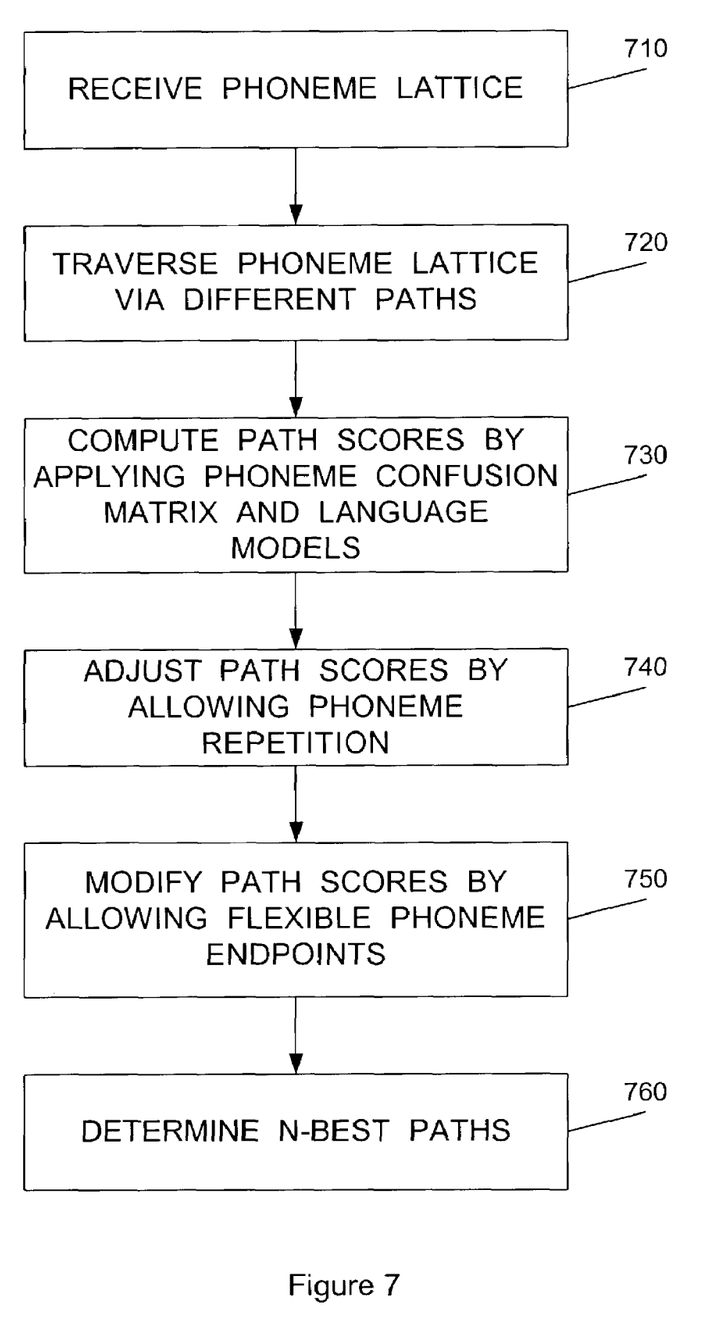
FIG. 7 is an exemplary flow diagram of a process in which a phoneme lattice of a speech signal is searched to recognize speech or spot keywords in the speech signal, according to an embodiment of the present invention.

FIG. 7 is an exemplary flow diagram of a process in which a phoneme lattice of a speech signal is searched to recognize speech or spot keywords in the speech signal, according to an embodiment of the present invention. At block 710, a phoneme lattice may be received. At block 720, the phoneme lattice may be traversed via all possible paths to find a most likely candidate textual representation of an input speech signal or to determine if the input speech signal contains targeted keywords. At block 730, a likelihood score may be computed for each traversed path. In one embodiment, a phoneme confusion matrix and language models may be used to compute the likelihood score. The phoneme confusion matrix may comprise a plurality of elements, which represent probabilities of each phoneme being confused with another during the phoneme lattice search process. These elements may be obtained by training from a database. In one embodiment, the elements of the phoneme confusion matrix may be associated with penalty scores. The less likely phoneme 1 is confused with phoneme 2, the higher penalty score may be applied when such confusion does occur. For example, when an expected phoneme sequence is <p0, p1> but actual traversed path results in a phoneme sequence <p0, p2>, p1 may be considered confused with p2 and a penalty score may be thus added so that a path containing the <p0, p2> sequence may result in a lower likelihood score. Additionally, the elements of the phoneme confusion matrix may be weighted to consider dependencies between adjacent frames. The language models may help narrow search scope by eliminating unlikely paths that contain rare phoneme and/or word sequences.

At block 740, a path score may be adjusted by allowing repetition of phonemes. For example, phoneme sequence "d-d-ay-l-l" may also be interpreted as word "dial", although the correct phoneme representation of "dial" is "d-ay-l". Allowing repetitions of phonemes may help solve a common problem with a phoneme lattice, that is, a phoneme with a long duration may be broken into repetition of the same phoneme but with a shorter duration. At block 750, a path score may be further modified by allowing flexible phoneme endpoints. Because phonemes are represented by arcs in a phoneme lattice, allowing flexible phoneme endpoints is equivalent to allowing flexible arc endpoints. For example, if a first arc ends at frame 10 and a second arc starts at frame 12, the ending point of the first arc and/or the starting point of the second arc may be allowed to be stretched so that the two arcs are directly connected (e.g., allowing the first arc to end at frame 11 and the second arc to start at frame 11). At block 760, N best paths may be determined by selecting those paths whose likelihood scores are in the top N among all potential paths. N may be one or a number larger than one. When N is larger than one, more than one result may be provided for a user to choose from.

Figure 8:
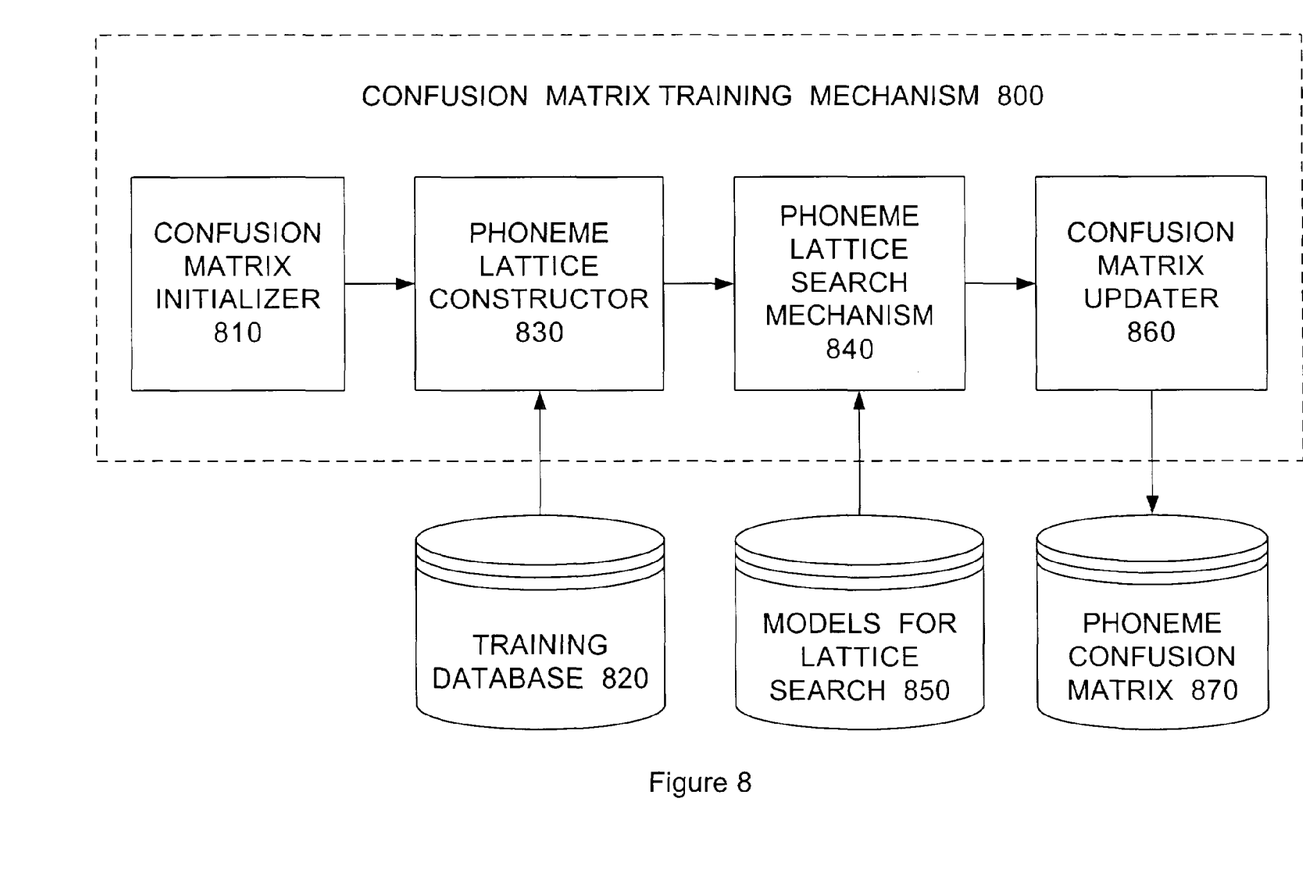
FIG. 8 is a high-level functional block diagram of a phoneme confusion matrix training mechanism, according to an embodiment of the present invention.

FIG. 8 is a high-level functional block diagram of a phoneme confusion matrix training mechanism, according to an embodiment of the present invention. The phoneme confusion matrix training mechanism 800 may comprise a confusion matrix initializer 810, a phoneme lattice constructor 830, a phoneme lattice search mechanism 840, and a confusion matrix updater 860. The confusion matrix initializer 810 may initialize a confusion matrix. In one embodiment, the confusion matrix initializer may initialize diagonal elements of the confusion matrix to a positive value less than but close to 1 and other elements with a small positive value close to 0, so that the sum of elements in each row equals to 1. In another embodiment, the elements of the confusion matrix may be initialized to any value between 0 and 1, as long as the sum of elements in each row equals to 1. The phoneme lattice constructor 830 here and the phoneme lattice constructor 110 in FIG. 1 are similar and may be used interchangeably. The phoneme lattice constructor may accept speech signals from the training database 810 and construct phoneme lattices for these speech signals. The training database 810 may comprise speech signals, actual phoneme sequences for these signals, and actual phoneme endpoints in each signal. The actual phoneme endpoints may represent signal-phoneme time alignment information between a speech signal and its corresponding phoneme sequence.

The phoneme lattice search mechanism 840 here is similar to the phoneme lattice search mechanism 130 in FIG. 1. The phoneme lattice search mechanism may accept the phoneme lattices constructed by the phoneme lattice constructor and search each of the phoneme lattices using models for lattice search 850. The models for lattice search 850 may comprise the initialized phoneme confusion matrix and a plurality of language models. The phoneme lattice search mechanism may search a phoneme lattice to produce a phoneme sequence hypothesis for a speech signal in a forced-alignment manner, that is, actual phoneme endpoints in the speech signal are kept unchanged for the phoneme sequence hypothesis. For example, if frames 1 to 5 correspond to actual phoneme 1 and frames 5 to 12 correspond to actual phoneme 2 in a speech signal, the phoneme lattice search mechanism must find a phoneme sequence hypothesis that starts with a phoneme x from frame 1 to frame 5 and follows by a phoneme y from frame 5 to frame 12. In this way, phoneme x and phoneme y can be reliably compared with actual phoneme 1 and actual phoneme 2, respectively.

The confusion matrix updater 860 may comprise a confusion probability estimator to estimate confusion probabilities between phonemes based on statistics obtained from forced-aligned comparisons between actual and hypothetical phoneme sequences. These estimated confusion probabilities may replace initial elements of the confusion matrix so that the confusion matrix may be updated. In one embodiment, the confusion matrix initializer may use the newly estimated elements of the confusion matrix to initialize the confusion matrix so that a new set of confusion probabilities can be estimated and the confusion matrix may be further updated.

Figure 9:
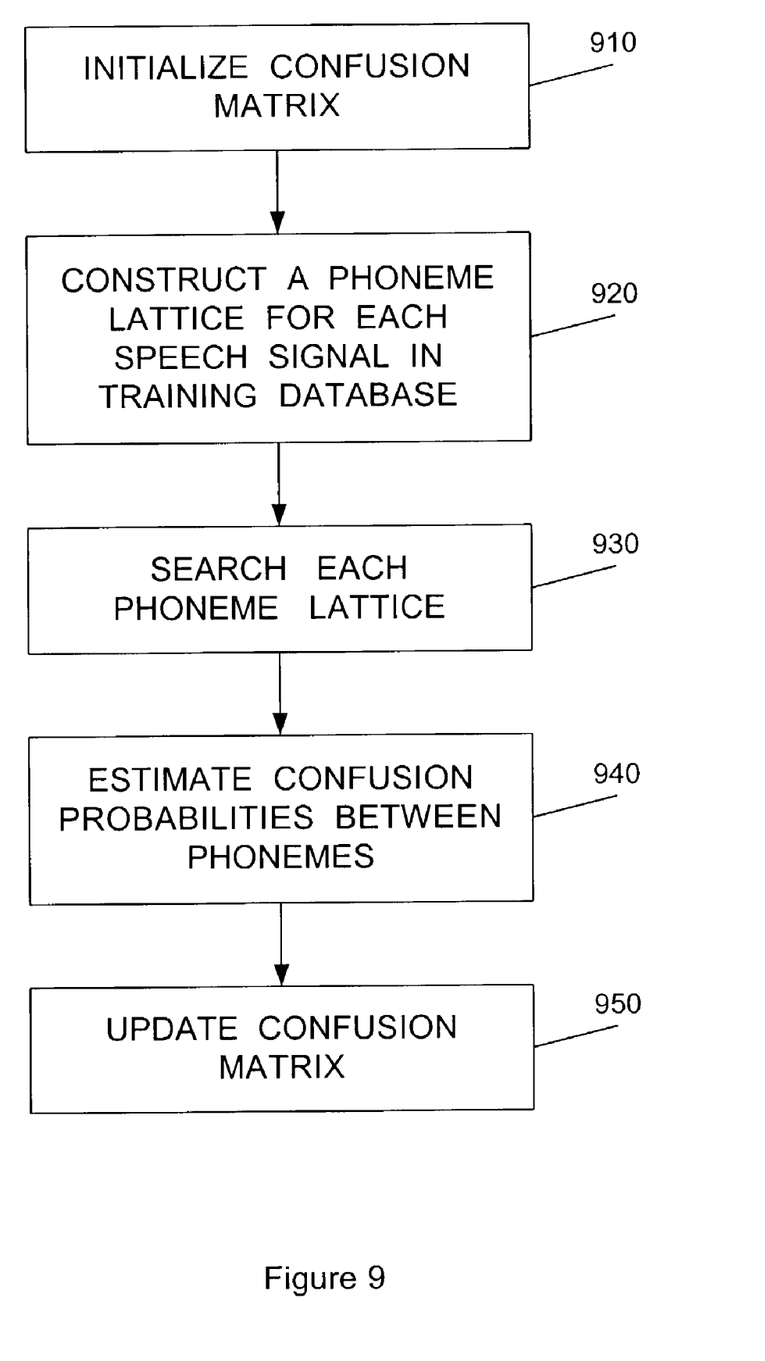
FIG. 9 is an exemplary flow diagram of a process in which a phoneme confusion matrix is trained from a database of speech signals, according to an embodiment of the present invention.

FIG. 9 is an exemplary flow diagram of a process in which a phoneme confusion matrix is trained from a database of speech signals, according to an embodiment of the present invention. At block 910, a confusion matrix may be initialized. Elements of the confusion matrix may be initially set to randomly chosen values between 0 and 1 as long as a sum of elements in each row equals to 1. The elements of the confusion matrix may also be initially set to trained confusion probabilities between phonemes so that the trained confusion probabilities can be refined and more accurate confusion probabilities can be obtained. At block 920, a phoneme lattice for a speech signal in a training database may be constructed. At block 930, the phoneme lattice for the speech signal may be searched, in a forced-alignment way, to produce a best phoneme sequence hypothesis for the speech signal. At block 940, confusion probabilities between phonemes may be estimated from statistics obtained by comparing each best phoneme sequence hypothesis and its corresponding actual phoneme sequence for each speech signal in the training database. At block 950, the confusion matrix may be updated by replacing elements in the confusion matrix with the newly estimated confusion probabilities between phonemes. In one embodiment, the updated confusion matrix may be used as a newly initialized confusion matrix to reiterate processes in block 920 through block 950 until a newly updated confusion matrix meets convergence criteria. The convergence criteria may be that the difference between the newly updated confusion matrix and its most recent preceding confusion matrix satisfies a specified requirement. The difference may be measured by a square sum distance between the two confusion matrices.

Although the present invention is for constructing a phoneme lattice for speech recognition and/or keyword spotting, persons of ordinary skill in the art will readily appreciate that the present invention may be used for constructing a word lattice, a triphone lattice, and/or lattices composed of other acoustic units, for speech recognition, keyword spotting, and/or other speech processing such as speech synthesis.

Although an example embodiment of the present invention is described with reference to block and flow diagrams in FIGS. 1-9, persons of ordinary skill in the art will readily appreciate that many other methods of implementing the present invention may alternatively be used. For example, the order of execution of the blocks in flow diagrams may be changed, and/or some of the blocks in block/flow diagrams described may be changed, eliminated, or combined.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features, components, or modules were omitted, simplified, combined, or split in order not to obscure the present invention.

Embodiments of the present invention may be implemented on any computing platform, which comprises hardware and operating systems. Processing required by the embodiments may be performed by a general-purpose computer alone or in connection with a special purpose computer. Such processing may be performed by a single platform or by a distributed processing platform. In addition, such processing and functionality can be implemented in the form of special purpose hardware or in the form of software.

If embodiments of the present invention are implemented in software, the software may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for processing a speech signal, comprising:
   using a memory, coupled to a processor, to receive an input speech signal;
   using the processor to construct a phoneme lattice for the input speech signal;
   determining vertices and arc parameters of the phoneme lattice for the input speech signal;
   searching the phoneme lattice to produce a likelihood score for each potential path; and
   determining a processing result for the input speech signal based on the likelihood score of each potential path;
   wherein constructing the phoneme lattice includes:
      segmenting an input speech signal into frames,
      extracting acoustic features for a frame of the input speech signal,
      determining K-best initial phoneme paths leading to the frame based on a first score of each potential phoneme path leading to the frame, and
      calculating a second score for each of the K-best phoneme paths for the frame;
   wherein searching the phoneme lattice comprises:
      receiving a phoneme lattice;
      traversing the phoneme lattice via potential paths;
      computing a score for a traversed path based on at least one of a phoneme confusion matrix and a plurality of language models; and
      modifying the score for the traversed path by allowing repetition of phonemes and allowing flexible endpoints for phonemes in a path such that at least one of a first arc that ends at a first frame and a second arc that starts at a third frame is extended so that the first arc and the second arc are directly connected at a second frame.

2. The method of claim 1, wherein determining the processing result comprises determining at least one of the following: at least one candidate textual representation of the input speech signal and a likelihood that the input speech signal contains targeted keywords.

3. The method of claim 1, wherein determining vertices and arc parameters of the phoneme lattice comprises:
   clustering together K-best initial phoneme paths for at least one consecutive frame; and
   selecting M-best refined phoneme paths among the clustered phoneme paths based on second scores of these paths.

4. The method of claim 1, wherein the first score and the second score comprise a score based on phoneme acoustic models and language models.

5. A method for distributing speech processing, comprising:
   using a memory, included in a client, to receive an input speech signal;
   using a processor, included in the client and coupled to the memory, to construct a phoneme lattice for the input speech signal;
   determining vertices and arc parameters of the phoneme lattice for the input speech signal;
   transmitting the phoneme lattice from the client to a server; and
   searching the phoneme lattice to produce a result for the input speech signal for the purpose of at least one of recognizing speech and spotting keywords, in the input speech signal;
   wherein constructing the phoneme lattice includes:
      segmenting an input speech signal into frames,
      extracting acoustic features for a frame of the input speech signal,
      determining K-best initial phoneme paths leading to the frame based on a first score of each potential phoneme path leading to the frame, and
      calculating a second score for each of the K-best phoneme paths;
   wherein searching the phoneme lattice comprises:
      receiving a phoneme lattice;
      traversing the phoneme lattice via potential paths;
      computing a score for a traversed path based on at least one of a phoneme confusion matrix and a plurality of language models; and
      modifying the score for the traversed path by allowing repetition of phonemes and allowing flexible endpoints for phonemes in a path such that at least one of a first arc that ends at a first frame and a second arc that starts at a third frame is extended such that the first arc and the third arc are directly connected at a second frame.

6. The method of claim 5, wherein determining vertices and arc parameters of the phoneme lattice comprises:
   clustering together K-best initial phoneme paths for at least one consecutive frame; and selecting M-best refined phoneme paths among the clustered phoneme paths based on second scores of these paths.

7. The method of claim 5, wherein the first score and the second score comprise a score based on phoneme acoustic models and phoneme language models.

8. A speech processing system, comprising:
a phoneme lattice constructor to construct a phoneme lattice for an input speech signal;
a phoneme lattice search mechanism to search the phoneme lattice for the purpose of at least of recognizing speech and spotting keywords, in the input speech signal;
a plurality of models for lattice construction; and
a plurality of models for lattice search;
wherein the phoneme lattice constructor includes:
an acoustic feature extractor to segment the input speech signal into frames and to extract acoustic features for a frame,
a phoneme path estimator to determine K-best initial phoneme paths leading to the frame,
a global score evaluator to determine M-best refined phoneme paths based on a cluster of K-best paths of at least one consecutive frame, and
a lattice parameter identifier to identify lattice vertices and arc parameters based on M-best refined phoneme paths of each frame, wherein at least one of a first arc that ends at a first frame and a second arc that starts at a third frame is extended such that the first arc and the third arc are directly connected at a second frame.

9. The system of claim 8, wherein the plurality of models for lattice construction comprise a plurality of phoneme acoustic models and a plurality of language models.

10. The system of claim 8, wherein the plurality of models for lattice search comprise a phoneme confusion matrix and a plurality of language models.

11. An article comprising: a machine accessible medium having content stored thereon, wherein the content is accessed by a processor, the content provides for processing a speech signal by:
receiving an input speech signal;
constructing a phoneme lattice for the input speech signal;
determining arc parameters of the phoneme lattice;
receiving a phoneme lattice;
traversing the phoneme lattice via potential paths;
computing a score for a traversed path based on at least one of a phoneme confusion matrix and a plurality of language models; and
modifying the score for based on flexible endpoints for phonemes in the traversed path; and
determining a processing result for the input speech signal based on the modified score.

12. An article comprising: a machine accessible medium having content stored thereon, wherein when the content is accessed by a processor, the content provides for distributing speech processing by:
receiving an input speech signal by a client;
constructing a phoneme lattice for the input speech signal by the client;
determining vertices and arc parameters of the phoneme lattice for the input speech signal;
transmitting the phoneme lattice from the client to a server; and
searching the phoneme lattice to produce a result for the input speech signal for the purpose of at least one of recognizing speech and spotting keywords, in the input speech signal;
wherein constructing the phoneme lattice includes:
segmenting an input speech signal into frames,
extracting acoustic features for a frame of the input speech signal,
determining K-best initial phoneme paths leading to the frame based on a first score of each potential phoneme path leading to the frame, and
calculating a second score for each of the K-best phoneme paths;
wherein searching the phoneme lattice comprises:
receiving a phoneme lattice;
traversing the phoneme lattice via potential paths;
computing a score for a traversed path based on at least one of a phoneme confusion matrix and a plurality of language models; and
modifying the score for the traversed path by allowing flexible endpoints for phonemes in a path such that, based on the flexible endpoints, at least one of a first arc that ends at a first frame and a second arc that starts at a third frame is extended so that the first arc and the second arc are directly connected at a second frame.

13. The article of claim 12, wherein determining vertices and arc parameters of the phoneme lattice comprises:
clustering together K-best initial phoneme paths for at least one consecutive frame; and
selecting M-best refined phoneme paths among the clustered phoneme paths based on second scores of these paths.

* * * * *

UNITED STATES PATENT AND TRADEMARK OFFICE
CERTIFICATE OF CORRECTION

| | | |
|---|---|---|
| PATENT NO. | : 7,725,319 B2 | |
| APPLICATION NO. | : 10/616310 | |
| DATED | : May 25, 2010 | |
| INVENTOR(S) | : Hagai Aronowitz | |

It is certified that error appears in the above-identified patent and that said Letters Patent is hereby corrected as shown below:

Column 11:
Line 44, delete "receiving a phoneme lattice;";

Column 12:
Line 1, "modifying the score for based" should be --modifying the score based--.

Signed and Sealed this
Twenty-sixth Day of July, 2011

David J. Kappos
*Director of the United States Patent and Trademark Office*